(12) United States Patent
Reader et al.

(10) Patent No.: US 12,523,272 B2
(45) Date of Patent: Jan. 13, 2026

(54) CONFIGURABLE AND TUNABLE VIBRATION DAMPENER USEABLE IN A VEHICLE

(71) Applicant: GM Global Technology Operations LLC, Detroit, MI (US)

(72) Inventors: Edeena Alicia Reader, Canton, MI (US); Elise Renee Friedman, Royal Oak, MI (US); Mark J. Ostin, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 483 days.

(21) Appl. No.: 18/073,788

(22) Filed: Dec. 2, 2022

(65) Prior Publication Data

US 2024/0183422 A1 Jun. 6, 2024

(51) Int. Cl.
*F16F 7/10* (2006.01)
*B60N 2/90* (2018.01)
(Continued)

(52) U.S. Cl.
CPC .............. *F16F 7/1005* (2013.01); *B60N 2/90* (2018.02); *F16F 7/104* (2013.01); *F16F 7/116* (2013.01);
(Continued)

(58) Field of Classification Search
CPC .......... F16F 1/3615; F16F 7/10; F16F 7/1005; F16F 7/1011; F16F 7/1017; F16F 7/104;
(Continued)

(56) References Cited

U.S. PATENT DOCUMENTS 4,238,104 A * 12/1980 Hamilton .................. F16F 3/10
188/380
5,016,409 A * 5/1991 Sato ........................ E01D 19/00
52/167.2
(Continued)

FOREIGN PATENT DOCUMENTS

DE 102016112543 A1 1/2017
EP 3396195 A1 * 10/2018 ................ F16F 7/00
(Continued)

OTHER PUBLICATIONS

KR-20090016948-A (Year: 2009).*
German Office Action for German Application No. 102023121006.8; dated Sep. 19, 2025; 5 pages.

Primary Examiner — Thomas J Williams
(74) Attorney, Agent, or Firm — CANTOR COLBURN LLP (57) ABSTRACT

A tunable vibration dampener includes a support including a first support wall and a second support wall spaced from the first support wall and a mass suspended between the first support wall and the second support wall. The mass has a first side surface and a second side surface. A first support system having a support member connects the first side surface and the first support wall and a second support system having a support element connects the second side surface and the second support wall. At least one of the support member and the support element is adjustable to establish a selected attenuation frequency for the tunable vibration dampener.

14 Claims, 8 Drawing Sheets

(51) Int. Cl.
*F16F 7/104* (2006.01)
*F16F 7/116* (2006.01)

(52) U.S. Cl.
CPC ..... *F16F 2222/08* (2013.01); *F16F 2228/066* (2013.01); *F16F 2230/0005* (2013.01); *F16F 2230/18* (2013.01)

(58) Field of Classification Search
CPC ........ F16F 7/108; F16F 7/116; F16F 2228/06; F16F 2228/066
USPC .................................................. 188/379–380
See application file for complete search history.

(56) References Cited

U.S. PATENT DOCUMENTS

| | | | | |
|---|---|---|---|---|
| 6,508,343 B2* | 1/2003 | Misaji | ...................... | B62D 1/04 |
| | | | | 267/141 |
| 6,681,908 B2* | 1/2004 | Davis | ....................... | F16F 7/116 |
| | | | | 188/380 |
| 7,410,039 B2* | 8/2008 | Or | ........................... | F16F 7/1005 |
| | | | | 188/380 |
| 2013/0152721 A1* | 6/2013 | Trendov | .................. | B62D 7/222 |
| | | | | 74/552 |
| 2018/0245655 A1* | 8/2018 | Lacarbonara | ......... | F16F 7/1005 |
| 2019/0186578 A1* | 6/2019 | Tamaki | .................. | F16F 7/1034 |
| 2021/0246879 A1* | 8/2021 | Mortensen | ............. | F03D 80/00 |
| 2024/0183422 A1* | 6/2024 | Reader | ................... | B60N 2/501 |

FOREIGN PATENT DOCUMENTS

| | | | | | |
|---|---|---|---|---|---|
| JP | 03144137 | A | * | 6/1991 | .............. F16F 15/02 |
| KR | 20090016948 | A | * | 2/2009 | ............ F16F 1/3615 |
| WO | WO-2013042152 | A1 | * | 3/2013 | .............. F16F 15/06 |

\* cited by examiner

CONFIGURABLE AND TUNABLE VIBRATION DAMPENER USEABLE IN A VEHICLE

INTRODUCTION

The subject disclosure relates to the art of vibration dampeners and, more particularly, to a configurable and tunable vibration dampener useable in a vehicle.

Systems, particularly those that have moving parts, vibrate. In many cases, the vibrations go un-noticed. In other cases, the vibrations may require individuals to wear hearing protection. In still other cases, the vibrations may create a noise that is annoying. Vibrations may cause visual disturbance and may cause physical discomfort and unwellness. Vibrations are often dampened in order to reduce noise, rattles, and the like. Vibration dampeners can come in a variety of shapes and sizes. Typically, the dampener is constructed to operate at a fixed frequency to dampen a particular vibration frequency.

In a vehicle for example, a number of components may vibrate. Each component may vibrate at a different frequency. As such, multiple vibration dampeners must be designed, tested, and mounted in a vehicle. Other systems may include many more vibration frequencies. Designing, testing, and creating mounting systems for multiple dampers is a time consuming and costly process. Accordingly, it is desirable to provide a vibration dampener that may be selectively tuned and fixed at a specific vibration frequency or frequency range, or be adjustable after installation to counter act vibrations whose frequencies may be changing

SUMMARY

A tunable vibration dampener, in accordance with a non-limiting example, includes a support including a first support wall and a second support wall spaced from the first support wall and a mass suspended between the first support wall and the second support wall. The mass has a first side surface and a second side surface. A first support system having a support member connects the first side surface and the first support wall and a second support system having a support element connects the second side surface and the second support wall. At least one of the support member and the support element is adjustable to establish a selected attenuation frequency for the tunable vibration dampener.

In addition to one or more of the features described herein the support member includes a first cable and a second cable, and the support element includes a third cable and a fourth cable.

In addition to one or more of the features described herein a first tuning element is connected to the first cable and a second tuning element is connected to the second cable, the first tuning element and the second tuning element being operable to adjust a tension in corresponding ones of the first cable and the second cable.

In addition to one or more of the features described herein the first tuning element comprises a first motor and the second tuning element comprises a second motor, the tunable vibration dampener including a controller connected to each of the first motor and the second motor, the controller being operable to establish a selected tension of the first cable and the second cable.

In addition to one or more of the features described herein the support member includes a first spring and the support element includes a second spring.

In addition to one or more of the features described herein a first tuning element connected to the first spring and a second tuning element connected to the second spring.

In addition to one or more of the features described herein the first tuning element comprises a first motor and the second tuning element comprises a second motor, the tunable vibration dampener including a controller connected to each of the first motor and the second motor, the controller being operable to establish a selected tension of the first spring and the second spring.

In addition to one or more of the features described herein the support comprises a support bracket mountable to a surface to be dampened.

A vehicle, in accordance with a non-limiting example, includes a body defining a passenger compartment having at least one seat and a tunable vibration dampener mounted in the body. The tunable vibration dampener includes a support including a first support wall and a second support wall spaced from the first support wall. A mass is suspended between the first support wall and the second support wall. The mass has a first side surface and a second side surface. A first support system having a support member connects the first side surface and the first support wall and a second support system having a support element connects the second side surface and the second support wall. At least one of the support member and the support element being adjustable so as to establish a selected attenuation frequency for the tunable vibration dampener.

In addition to one or more of the features described herein the support member includes a first cable and a second cable, and the support element includes a third cable and a fourth cable.

In addition to one or more of the features described herein a first tuning element is connected to the first cable and a second tuning element is connected to the second cable, the first tuning element and the second tuning element being operable to adjust tension in corresponding ones of the first cable and the second cable.

In addition to one or more of the features described herein the first tuning element comprises a first motor and the second tuning element comprises a second motor, the tunable vibration dampener including a controller connected to each of the first motor and the second motor, the controller being operable to establish a selected tension of the first cable and the second cable.

In addition to one or more of the features described herein the support member includes a first spring and the support element includes a second spring.

In addition to one or more of the features described herein a first tuning element is connected to the first spring and a second tuning element is connected to the second spring.

In addition to one or more of the features described herein the first tuning element comprises a first motor and the second tuning element comprises a second motor, the tunable vibration dampener including a controller connected to each of the first motor and the second motor, the controller being operable to establish a selected tension of the first spring and the second spring.

In addition to one or more of the features described herein the support comprises a support bracket mountable to a surface to be dampened.

In addition to one or more of the features described herein the first support wall includes a first seat frame surface and the second support wall includes a second seat frame surface, the mass is suspended between the first seat frame surface and the second seat frame surface.

A method of dampening vibrations with a vibration dampener having a mass suspended between a first support wall and a second support wall, in accordance with a non-limiting example, includes sensing vibrations in a system, determining an attenuation frequency for the mass, and adjusting a tension of one of a support member connecting the mass to the first support wall and a support element connecting the mass to the second support wall to establish the attenuation frequency.

In addition to one or more of the features described adjusting the tension includes one of twisting a cable extending between the mass and the one of the first support wall and the second support wall and activating a motor to create a selected tension in the one of the support member and the support element.

In addition to one or more of the features described herein sensing vibrations in the system includes sensing vibrations in one or more sensors and controlling a plurality of vibration dampeners through a controller to attenuate vibrations sensed in the system.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
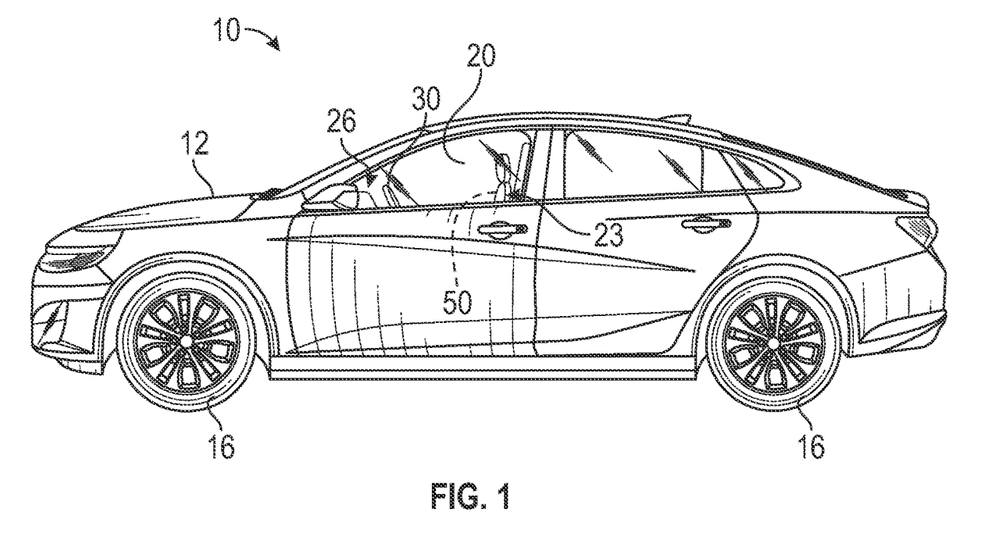
FIG. 1 is a left side view of a vehicle including a tunable vibration dampener, in accordance with a non-limiting example.

A vehicle, in accordance with a non-limiting example, is indicated generally at 10 in FIG. 1. Vehicle 10 includes a body 12 supported on a plurality of wheels 16. At least two of the plurality of wheels 16 are steerable. That is, changing a position of two of the plurality of wheels 16 relative to body 12 will cause vehicle 10 to change direction. Body 12 defines, in part, a passenger compartment 20 having seats, one of which is indicated at 23, positioned behind a dashboard 26. A steering control system 30 is arranged between seats 23 and dashboard 26.

Figure 2:
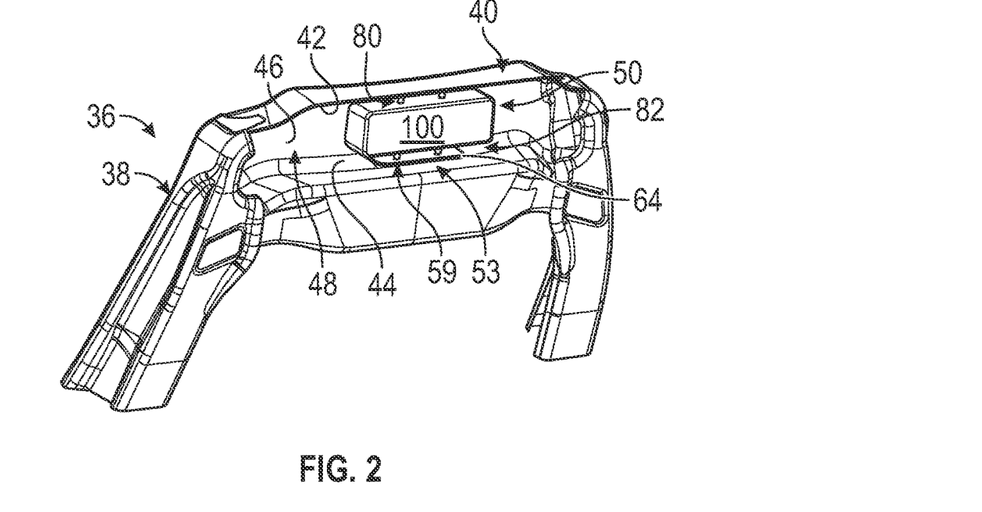
FIG. 2 is a rear upper left partial perspective view of a seat back frame including the tunable vibration dampener, in accordance with a non-limiting example.
Figure 3:
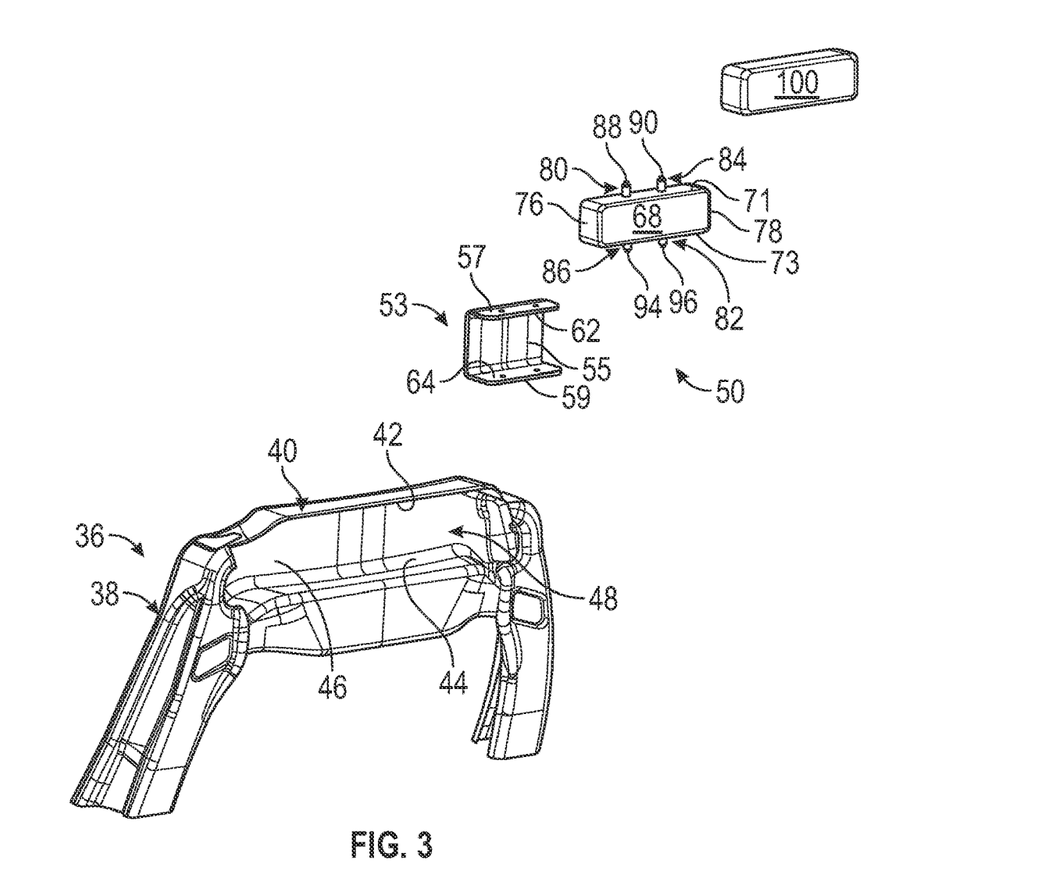
FIG. 3 is a disassembled view of the tunable vibration dampener of FIG. 2, in accordance with a non-limiting example.

Referring to FIGS. 2 and 3, seat 23 includes a seat back 36 having a seat back frame 38 including an upper member 40. In a non-limiting example, upper member 40 includes a first surface 42, a second surface 44 and a third surface 46 that connects first surface 42 and second surface 44. First surface 42, second surface 44, and third surface 46 define a recess 48 in upper member 40. In a non-limiting example, seat back frame 38 may vibrate during certain vehicle operational conditions. The vibrations are passed on to a passenger which may not appreciate the unwanted distraction. In order to mitigate vibrations, seat back frame 38 includes a tunable vibration dampener 50 mounted in recess 48. At this point, it should be understood that while shown as being mounted to seat back 36, tunable vibration dampener 50 may be mounted to a variety of other structures in vehicle 10 and can also be used in other systems and should not be considered to be limited to vehicle use.

In a non-limiting example shown in FIG. 3, tunable vibration dampener 50 includes a support bracket 53 that is mounted to third surface 46 in recess 48. Support bracket 53 includes a base wall 55, a first support wall 57 and a second support wall 59. First support wall 57 includes a first inner surface 62 and second support wall 59 includes a second inner surface 64. Tunable vibration dampener 50 includes a mass 68 suspended between first support wall 57 and second support wall 59 of support bracket 53. Mass 68 includes a first side surface 71, a second side surface 73 that is opposite first side surface 71, a third side surface 76, and a fourth side surface 78 that is opposite third side surface 76.

A first support system 80 connects mass 68 with first support wall 57 and a second support system 82 connects mass 68 with second support wall 59. As will be detailed herein, first and second support systems 80 and 82 allow mass 68 to oscillate between first support wall 57 and second support wall 59 at a select attenuation frequency or frequencies in the case that tunable vibration dampener 50 is configured to respond to vibrations in multiple directions. The attenuation frequency or frequencies are selected to counter-act or attenuate undesirable vibrations of seat back from 36.

In a non-limiting example, first support system 80 and/or second support system 82 may be adjustable. That is, adjustments may be made to first support system 80 and/or second support system 82 to establish and/or dial in the selected attenuating frequency or frequencies. The adjustments may include changing physical characteristics of first support system 80 and second support system 82 in situ, or removing and replacing first support system 80 and/or second support system 82 with members having different characteristics.

As shown in FIG. 3, first support system 80 includes a support member 84 and second support system 82 includes a support element 86. In a non-limiting example, support member 84 includes a first cable 88 and a second cable 90. Support element 86 includes a third cable 94 and a fourth cable 96. At this point, it should be understood that the number of cables used may vary and may be less than or more than four cables. Further, it should be understood that tunable vibration dampener 50 may be operable in one or more axes. That is, support members and support elements may be arranged on two or more opposing surfaces to attenuate vibrations that may occur in multiple axes. First and second cables 88 and 90 connect with first side surface 71 and first inner surface 62 and third and fourth cables 94 and 96 connect second side surface 73 with second inner surface 64. A protective cover 100 may be placed over mass 68. Protective cover 100 may be formed from, for example, rubber.

Figure 4:
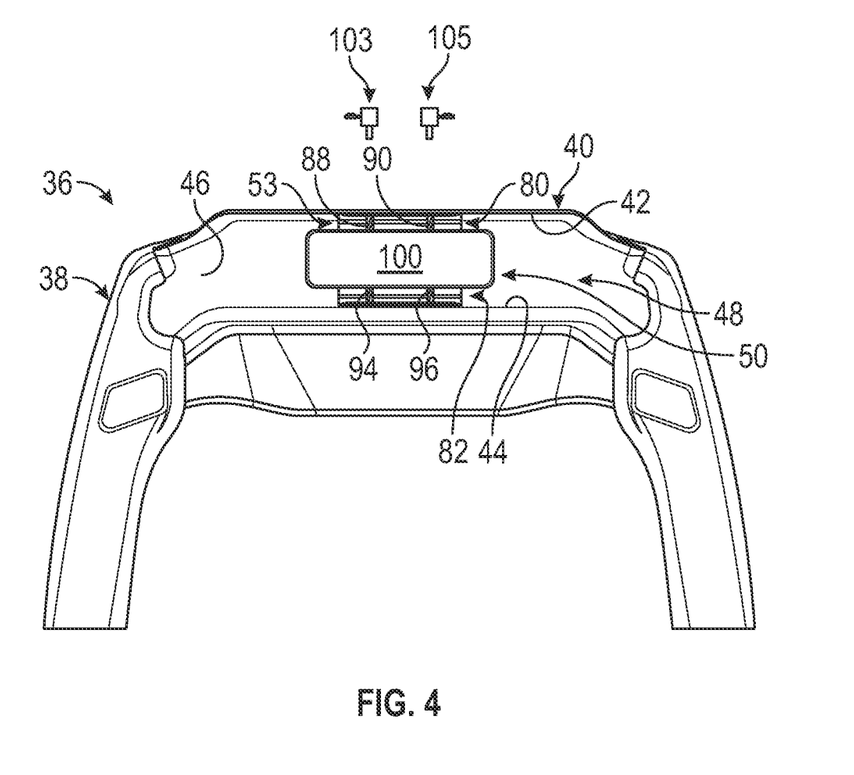
FIG. 4 is a rear plan view of the tunable vibration dampener of FIG. 2 including tuning elements, in accordance with a non-limiting example.

Referring to FIG. 4, first and second cables 88 and 90 are adjustable in one non-limiting example. That is, first and second cables 88 and 90 may be twisted or otherwise manipulated to establish a selected pre-tension that would ensure mass 68 oscillates at a selected attenuating frequency or frequencies. A first tuning element 103 may be connected to first cable 88 and a second tuning element 105 may be connected to second cable 90.

First and second tuning elements 103 and 105 may be rotated to establish a selected tension in corresponding ones of first and second cables 88 and 90 in order to establish a selected attenuating frequency that cancels undesirable frequencies perceived by an occupant of seat 23. If vibrations in vehicle 10 change creating new undesirable frequencies in seat back frame 38, first and second cables 88 and 90 may be adjusted with first and second tuning elements 103 and 105. It should be understood that the number of tuning elements may vary, that is, a single tuning element may be used to adjust tension in one or more of first cable 88, second cable 90, third cable 94 and/or fourth cable 96.

At this point, it should be understood that the tuning element(s) may be removed after adjustments are made. Further, in addition, or in the alternative to adjusting tension, cables 88, 90, 94, and 96 an also be tuned by changing their corresponding cross-sectional areas. That is, an inventory cable made having various cross-sectional areas may be available for use. The different cross-sectional areas may attenuate specific frequencies or frequency bands. Thus, cable may be removed and replaced as vibration profiles change to ensure that vibrations are attenuated.

Figure 5:
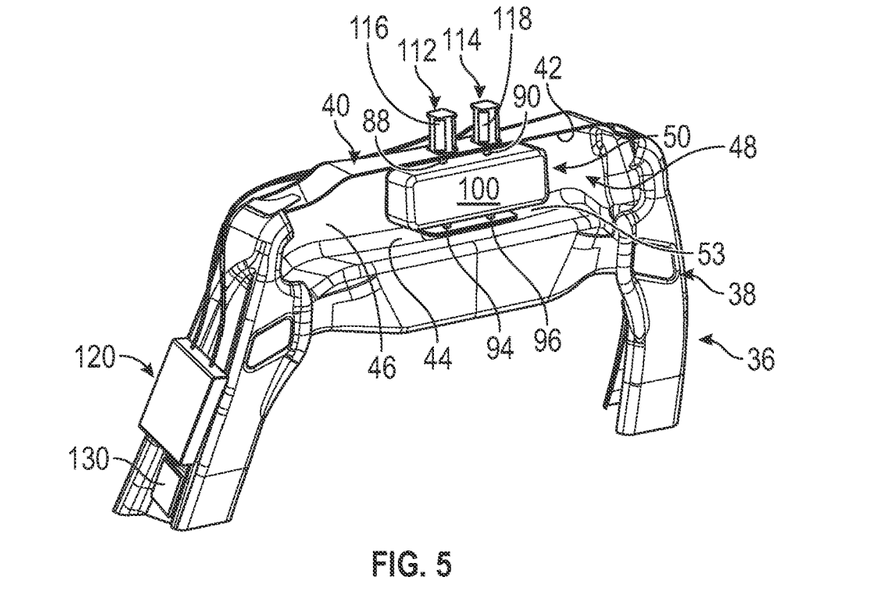
FIG. 5 is a rear upper left partial perspective view of a seat back frame including the tunable vibration dampener, in accordance with still yet another non-limiting example.
Figure 6:
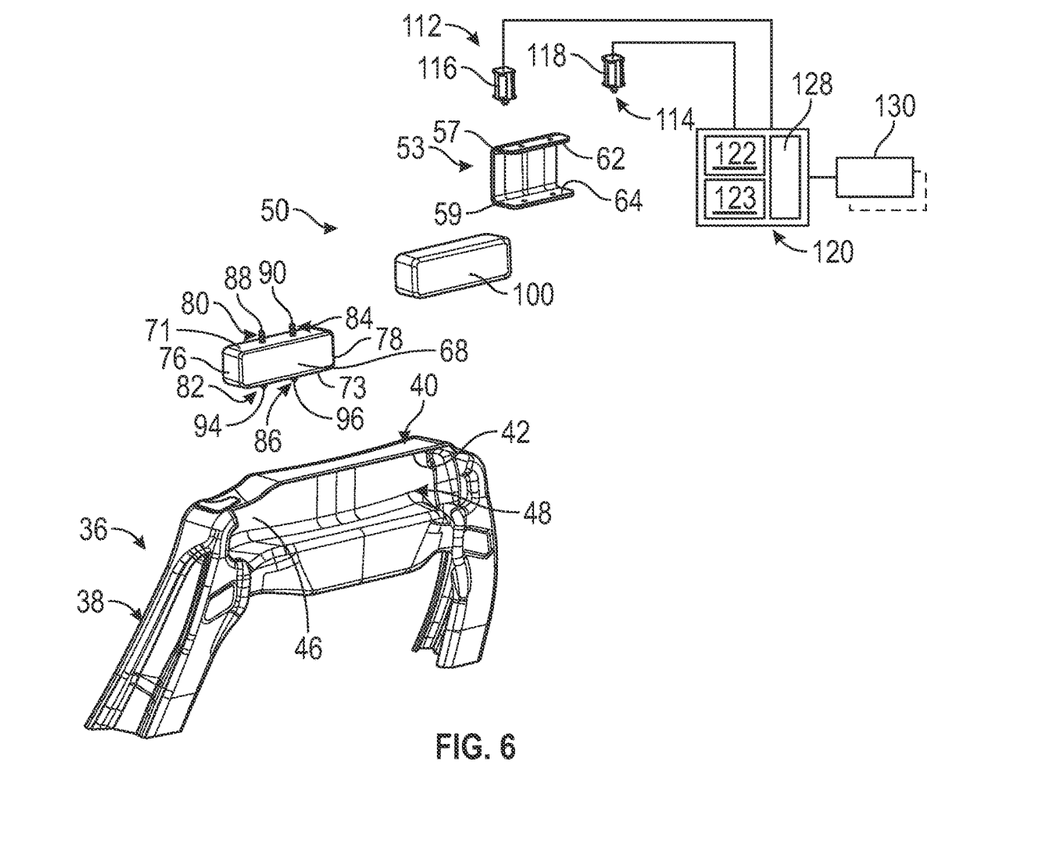
FIG. 6 is a disassembled view of the tunable vibration dampener of FIG. 5, in accordance with a non-limiting example.

Reference will now follow to FIGS. 5 and 6 in describing tunable vibration dampener 50 in accordance with another non-limiting example. Tunable vibration dampener 50 includes a first tuning element 112 and a second tuning element 114 mounted to upper member 40. First tuning element 112 is a first motor 116 connected to first cable 88 and second tuning element 114 is a second motor 118 connected to second cable 90. While shown and described as being motors, first and second tuning elements 114 and 116 may also take on other forms including shaped metal alloy elements, electrorheological elements, or the like. A controller 120 is connected to first motor 116 and second motor 118. Controller 120 may include a central processor unit (CPU) 122, a non-volatile memory 123 and a tuning control module 128. While shown as being co-located, each of the components that form controller 120 may be located in other vehicle systems.

In a non-limiting example, a sensor(s) 130 is mounted to seat back frame 38 and operatively connected to controller 120. Sensor(s) 130 detect vibrations in seat back 36 and pass data to controller 120. The sensed vibrations are evaluated by tuning control module 128 and compared to undesirable frequencies and/or amplitudes stored in non-volatile memory 123. If the sensed vibrations exist at a selected undesirable frequency or in an undesirable frequency band stored in non-volatile memory 123, tuning control module 128 signals first motor 116 and/or second motor 118 to adjust tension in first cable 88 and or second cable 90 to create an attenuation frequency for mass 68. The attenuation frequency cancels or dampens vibrations at undesirable frequencies sensed by sensor(s) 130. Vibrations in seat back frame 38 may be sampled continuously.

Figure 7:
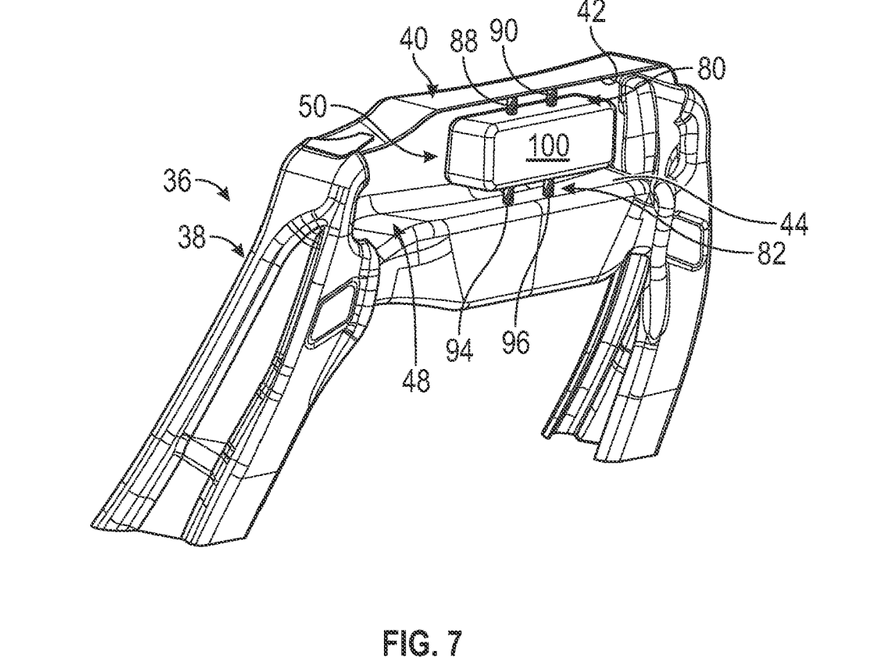
FIG. 7 is a rear upper left partial perspective view of a seat back frame including the tunable vibration dampener, in accordance with another non-limiting example.
Figure 8:
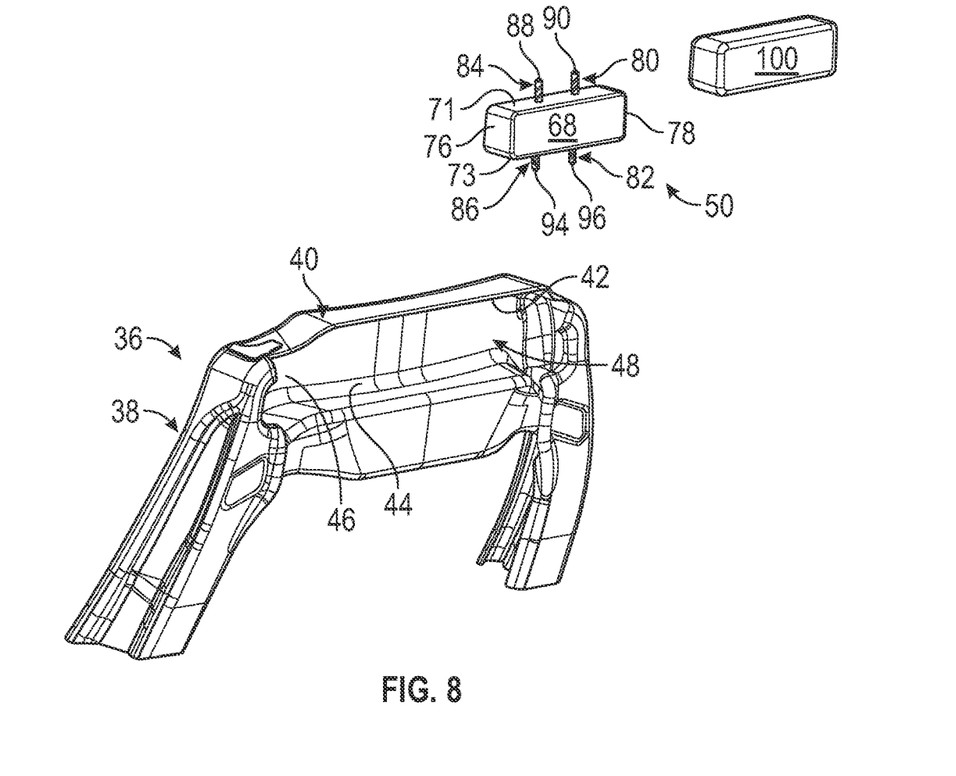
FIG. 8 is a disassembled view of the tunable vibration dampener of FIG. 7, in accordance with a non-limiting example.

In accordance with another non-limiting example shown in FIGS. 7 and 8, tunable vibration dampener 50 is mounted directly to seat back frame 38. First cable 88 and second cable 90 are connected directly to first surface 42. Third cable 94 and fourth cable 96 connect directly with second surface 44. First cable 88 and/or second cable 90 may be adjustable, or set at a fixed tension. Likewise, third cable 94 and/or fourth cable 96 may be tunable or may be set at a fixed tension. The tuning may be achieved by modifying the tension of cable 88 and/or 90. Alternatively, cables 88, 90, 94, and/or 96 may be replaced with cables having different cross-sectional areas targeted at attenuating specific frequencies or frequency bands. Seat back frame 38 may be monitored under various operating conditions. The detected vibrations may be used to select the fixed tension to establish a vibration attenuation frequency that will cancel and/or dampen vibrations perceived by seat back frame 38 without the need for sensors and controllers. By eliminating the support bracket, the attenuating frequency produced by mass 68 may pass directly into seat back frame 38.

Figure 9:
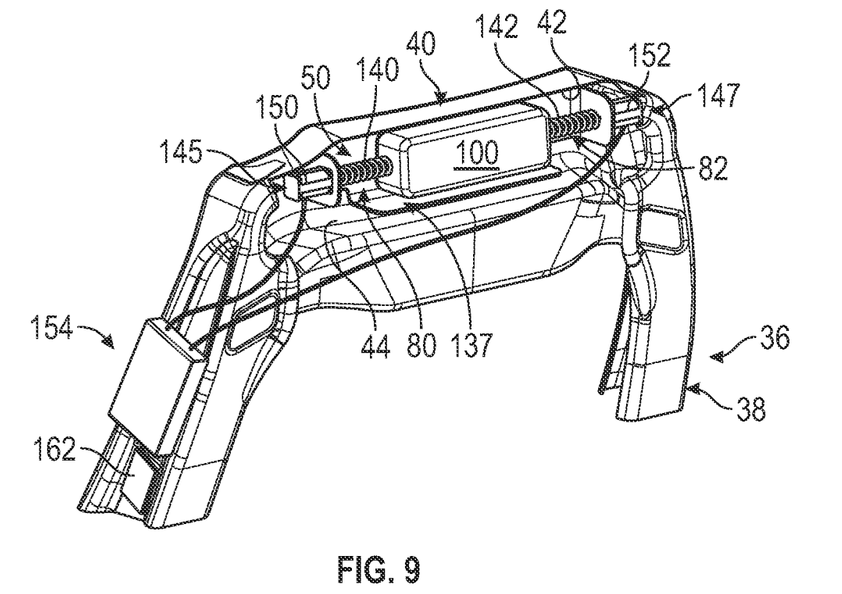
FIG. 9 is a rear upper left partial perspective view of a seat back frame including the tunable vibration dampener, in accordance with yet another non-limiting example.
Figure 10:
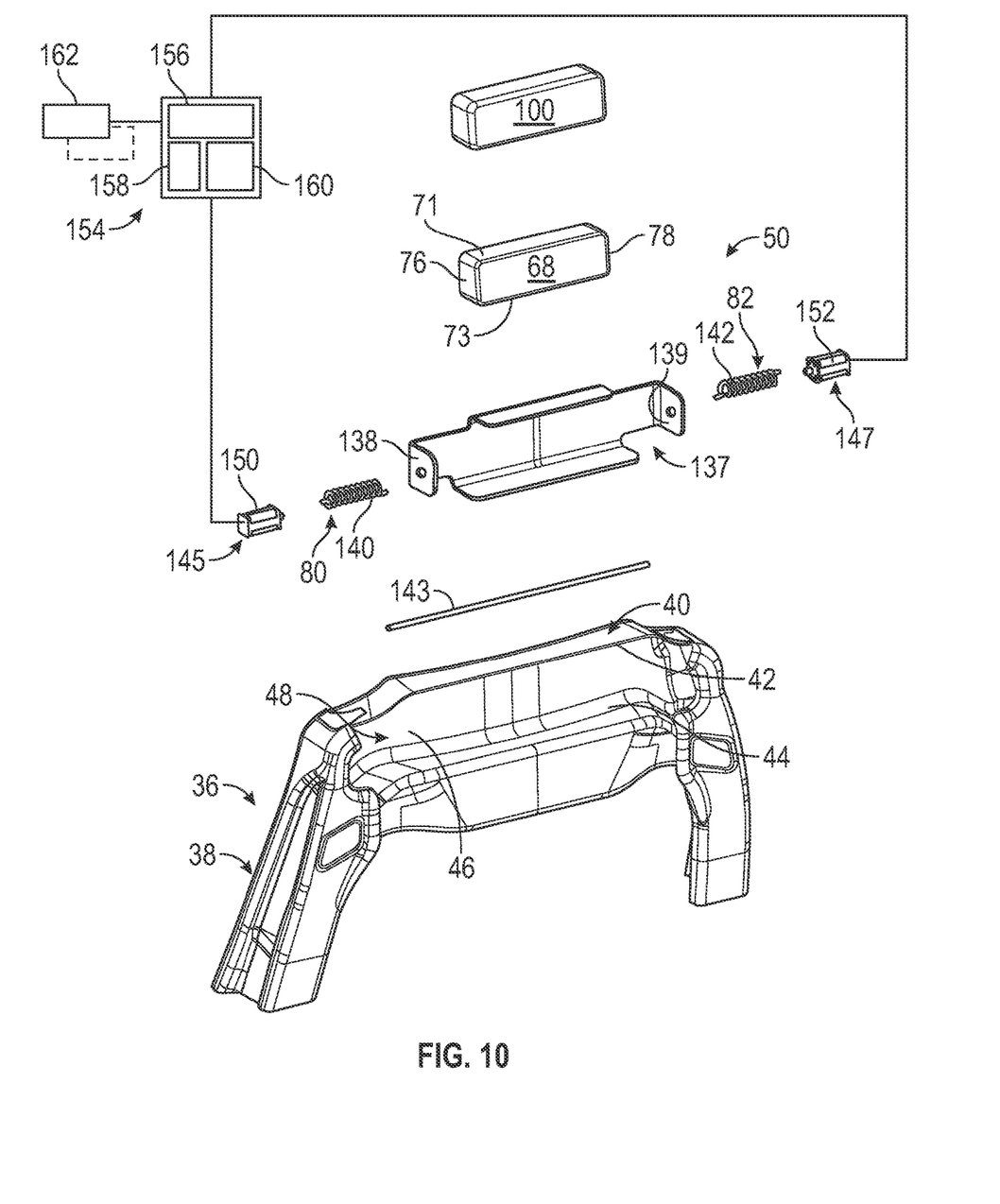
FIG. 10 is a disassembled view of the tunable vibration dampener of FIG. 9, in accordance with a non-limiting example.

Reference will now follow to FIGS. 9 and 10 in describing tunable vibration dampener 50 in accordance with another non-limiting example. Tunable vibration dampener 50 includes a bracket 137 mounted to third surface 46. Bracket 137 includes a first support wall 138 and a second support wall 139. First support wall 138 and second support wall 139 are arranged between first surface 42 and second surface 44 and spaced one from another along third surface 46. Mass 68 is suspended between first support wall 138 and second support wall 139.

In a non-limiting example, support member 80 takes the form of a first spring 140 that extends between and connects first support wall 138 and third side surface 76 of mass 68. Support element 82 takes the form of a second spring 142 that extends between second support wall 139 and fourth side surface 78 of mass 68. A stabilizing rod 143 extends through mass 68 and each of the first and second springs 140 and 142 and connects with bracket 137. Stabilizing rod 143 ensures that mass 68, when excited, travels along a single axis.

In a non-limiting example, a first tuning element 145 is mounted to first support wall 138 and connected to first spring 140 and a second tuning element 147 is mounted to second support wall 139 and connected to second spring 142. The number of tuning elements and the mounting of the tuning elements may vary. First tuning element 145 takes the form of a first motor 150 and second tuning element 147 takes the form of a second motor 152. In a manner similar to that discussed above, while described as being motors, first and second tuning elements 145 and 147 may also take on other forms including shaped metal alloy elements, electrorheological elements, or the like. In a non-limiting example, first and second motors 150 and 152 are operatively connected to a controller 154 having a central processing unit (CPU) 156, a non-volatile memory 158, and a tuning control module 160. While shown in FIG. 10 as being co-located, each of the components that form controller 154 may be located in other vehicle systems.

In a non-limiting example, a sensor(s) 162 is mounted to seat back frame 38 and operatively connected to controller 154. Sensor(s) 162 detect vibrations in seat back frame 38 and pass data to controller 154. The sensed vibrations are evaluated by tuning control module 160 and compared to undesirable frequencies stored in non-volatile memory 158. If the sensed vibrations exist at a frequency that is at an undesirable frequency or in an undesirable frequency band stored in non-volatile memory 158, tuning control module 160 signals first motor 150 and/or second motor 152 to adjust tension in first spring 140 and/or second spring 142 to create an attenuation frequency for mass 68. The attenuation frequency cancels or dampens vibrations at the undesirable frequencies sensed by sensor(s) 162 in seat back frame 38. Vibrations in seat back from 38 are sampled continuously so long as vehicle 10 is in operation.

Figure 11:
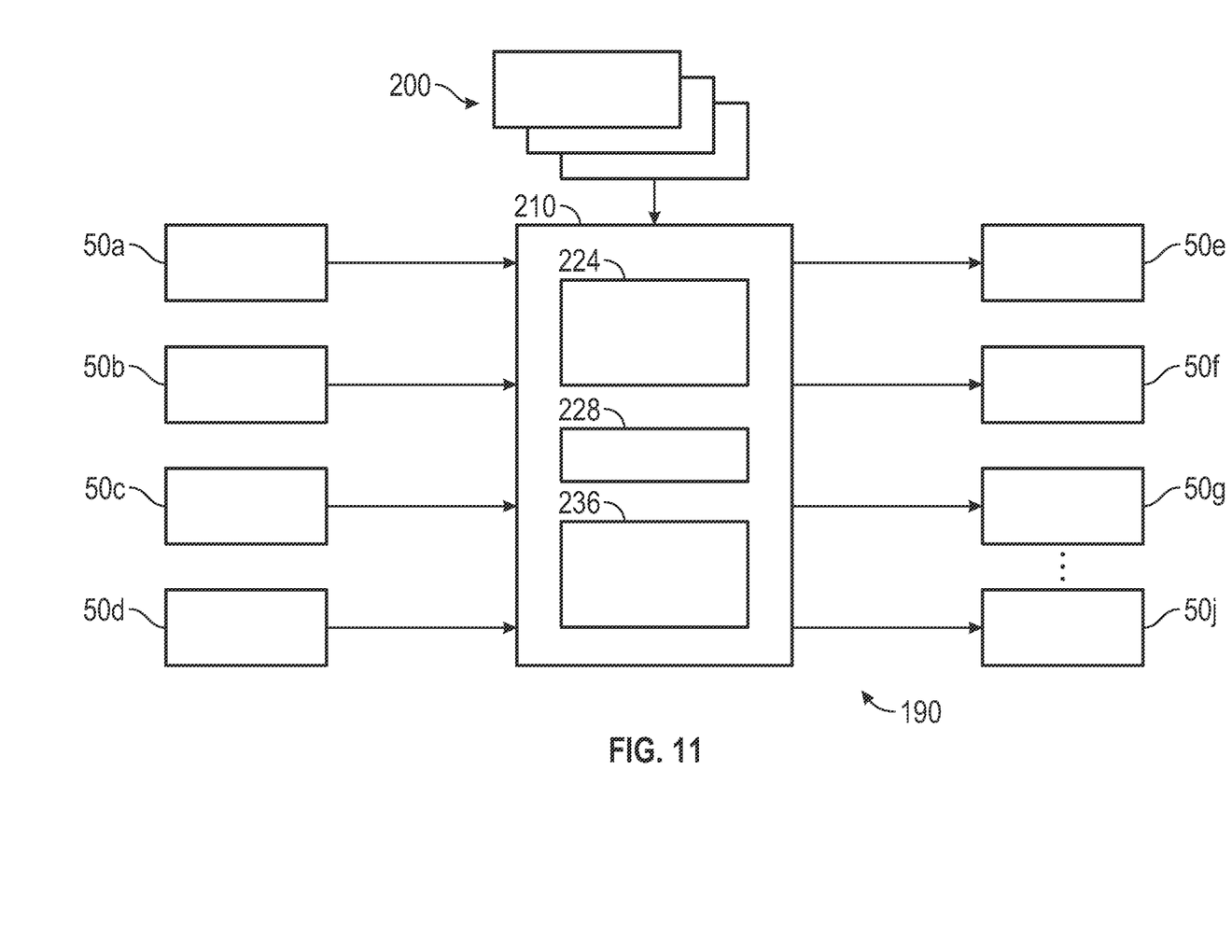
FIG. 11 is a schematic view of a control system operable to interact with and update multiple tunable vibration dampeners, in accordance with a non-limiting example.

Reference will now follow to FIG. 11 in describing a real-time vibration attenuation system 190 in accordance with a non-limiting example. One or more sensors 200 may be arrayed about a component or system of components experiencing vibration such as in a non-limiting example, vehicle 10. Sensor(s) 200 pass vibration data to a controller 210. Controller 210 includes a central processing unit (CPU) 224, a non-volatile memory 228, and a dampener control module 236. CPU 224 instructs dampener control module 236 to determine an attenuation frequency to mitigate the sensed vibrations. At this point it should be understood that while shown as being co-located, components of controller 210 may be located through various systems.

Dampener control module 236 may scan non-volatile memory 228 to select attenuation frequencies for each of a plurality of tunable vibration dampeners 50a-50j that may be arrayed about vehicle 10. Dampener control module 236 may determine a selected attenuation frequency based on distance from the source of vibration and on feedback received through sensor(s) 200. That is, sensor(s) 200 continually provide vibration data to controller 210 which, in turn, refines vibration attenuation characteristics in one or more of tunable vibration dampeners 50a-50j in order to mitigate vibrations to the extent possible.

At this point it should be understood that the tunable vibration dampener constructed in accordance with the non-limiting examples described herein may be readily adapted to a wide array of applications. That is, instead of constructing a vibration dampener to attenuate a specific frequency or frequencies, a single vibration dampener may be constructed in accordance with the non-limiting examples and tuned to attenuate a wide range of frequencies. Further, by employing tuning elements that may be adjusted, real time tuning attenuation may be achieved. The real time tuning attenuation adjustments may be made to adapt to changes in frequencies without the need for human interaction. It should be further understood that while shown in connection with a vehicle, the tunable vibration dampener can be employed in a wide array of devices, systems, industries, and the like.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle seat comprising:
   a seat back frame comprising an upper member having an upper surface and a lower surface defining a space therebetween; and
   a tunable vibration dampener disposed in the space and comprising:
      a support bracket including an upper support wall and a lower support wall spaced from the upper support wall;
      a mass suspended between the upper support wall and the lower support wall, the mass having an upper side surface and a lower side surface;
      an upper support system having an upper cable directedly attached to the upper side surface of the mass and extending to the upper support wall of the support bracket;
      a lower support system having a lower cable directly attached to the lower side surface of the mass and extending to the second support wall; and
      a tuning element connected to at least one of the upper cable and the lower cables that is configured to adjust tension of the upper cable or the lower cable to establish a selected attenuation frequency for the tunable vibration dampener.

2. The vehicle seat according to claim 1,
   wherein the upper cable is a first upper cable and the lower cable is a first lower cable,
   wherein the upper support system further comprises a second upper cable, and
   wherein the lower support system further includes a second lower cable.

3. The vehicle seat according to claim 2,
wherein the tuning element is a first tuning element connected to the first upper cable,
wherein the tunable vibration dampener further comprises a second tuning element connected to the second upper cable,
wherein the first tuning element is configured to adjust tension of the first upper cable, and
wherein the second tuning element is configured to adjust tension of the second cable.

4. The vehicle seat according to claim 3,
wherein the first tuning element comprises a first motor,
wherein the second tuning element comprises a second motor,
wherein the tunable vibration dampener includes a controller connected to each of the first motor and the second motor, and
wherein the controller is operable to establish a selected tension of the first cable and the second cable.

5. The vehicle seat dampener according to claim 1, wherein the support bracket is mounted on the upper and lower surfaces of the upper member.

6. A vehicle comprising:
a body defining a passenger compartment; and
the vehicle seat of claim 1 within the passenger compartment.

7. The vehicle according to claim 6,
wherein the upper cable is a first upper cable and the lower cable is a first lower cable,
wherein the upper support system further comprises a second upper cable, and
wherein the lower support system further includes a second lower cable.

8. The vehicle according to claim 7,
wherein the tuning element is a first tuning element connected to the first upper cable,
wherein the tunable vibration dampener further comprises a second tuning element connected to the second upper cable,
wherein the first tuning element is configured to adjust tension of the first upper cable, and
wherein the second tuning element is configured to adjust tension of the second upper cable.

9. The vehicle according to claim 8,
wherein the first tuning element comprises a first motor,
wherein the second tuning element comprises a second motor,
wherein the tunable vibration dampener includes a controller connected to each of the
first motor and the second motor, and
wherein the controller is operable to establish a selected tension of the first upper cable and the second upper cable.

10. The vehicle according to claim 6,
wherein the support bracket is mounted on the upper and lower surfaces of the upper member.

11. The vehicle seat of claim 1, wherein the upper cable and the tuning element are connected through an aperture in the upper support wall of the support bracket.

12. The vehicle seat of claim 1, wherein a cover is disposed around the mass and between the upper and lower support walls of the support bracket.

13. A vehicle seat comprising:
a seat back frame comprising an upper member having a first surface and a second surface defining a space therebetween; and
a tunable vibration dampener disposed in the space and comprising:
a support bracket including a first lateral support wall and a second lateral support wall spaced from the first lateral support wall;
a mass suspended between the first lateral support wall and the second lateral support wall, the mass having a first side surface and a second side surface;
a first support system having a first spring directedly attached to the first side surface of the mass and extending to the first lateral support wall of the support bracket;
a second support system having a second spring directedly attached to the second side surface of the mass and extending to the second lateral support wall of the support bracket; and
a tuning element connected to the first spring that is configured to adjust tension of the first spring to establish a selected attenuation frequency for the tunable vibration dampener,
wherein the tuning element is a first tuning element,
wherein the tunable vibration dampener further comprises a second tuning element connected to the second spring,
wherein the first tuning element comprises a first motor,
wherein the second tuning element comprises a second motor,
wherein the tunable vibration dampener includes a controller connected to each of the first motor and the second motor, and
wherein the controller is operable to establish a selected tension of the first spring and the second spring.

14. A vehicle comprising:
a body defining a passenger compartment; and
the vehicle seat of claim 13 within the passenger compartment.

* * * * *